United States Patent [19]
Platt et al.

[11] Patent Number: 5,424,717
[45] Date of Patent: Jun. 13, 1995

[54] LASER LIGHT TRANSMITTER AND PROXIMITY DETECTOR

[75] Inventors: Terence C. Platt, Binfield; Reginald K. Payne, Nr. Maidenhead, both of United Kingdom

[73] Assignee: Memco Limited, Berks, United Kingdom

[21] Appl. No.: 899,610

[22] Filed: Jun. 16, 1992

[30] Foreign Application Priority Data

Jun. 21, 1991 [GB] United Kingdom ............... 9113556

[51] Int. Cl.6 .............................................. G08B 13/18
[52] U.S. Cl. ............................... 340/551; 359/708
[58] Field of Search ............................ 340/555-557; 187/103-105; 359/708, 712; 362/259, 335

[56] References Cited

U.S. PATENT DOCUMENTS

| | | | |
|---|---|---|---|
| 4,460,066 | 7/1984 | Ohta | 340/556 X |
| 4,820,030 | 4/1989 | Griffin | 359/711 |
| 4,850,663 | 7/1989 | Yamamoto et al. | 359/664 X |
| 4,869,580 | 9/1989 | Silverglate | 359/718 |
| 4,874,063 | 10/1989 | Taylor | 187/130 |
| 5,025,895 | 6/1991 | Leone et al. | 340/555 X |

FOREIGN PATENT DOCUMENTS

| | | |
|---|---|---|
| 0102221 | 3/1984 | European Pat. Off. |
| 0226322 | 6/1987 | European Pat. Off. |
| 0286368 | 10/1988 | European Pat. Off. |
| 0290944 | 11/1988 | European Pat. Off. |
| 2506821 | 8/1976 | Germany |
| 3024679 | 1/1982 | Germany |
| 1538769 | 1/1979 | United Kingdom |
| 2166831 | 5/1986 | United Kingdom |
| 2178867 | 2/1987 | United Kingdom |
| 2207999 | 2/1989 | United Kingdom |

OTHER PUBLICATIONS

Copy of European search report based on priority document, searched completed Oct. 1991.

*Primary Examiner*—Brent Swarthout
*Assistant Examiner*—Thomas J. Mullen, Jr.
*Attorney, Agent, or Firm*—Cumpston & Shaw

[57] ABSTRACT

A laser light emitting diode (1, 2) situated at a focal point of a specially shaped lens (3, 4) produces a very thin intense fan-shaped beam. One or two such laser light transmitters are used to radiate a fan-shaped beam which is intercepted by a person or object thereby scattering laser light, by diffuse reflection. A cylindrical lens (5) receives a reflected component and this is detected by sensors (6) which are connected to circuitry including a synchronous detector (12) and comparator network (13, 14). The synchronous detector (12) is driven by a square wave oscillator (8) which modulates the laser light.

11 Claims, 6 Drawing Sheets

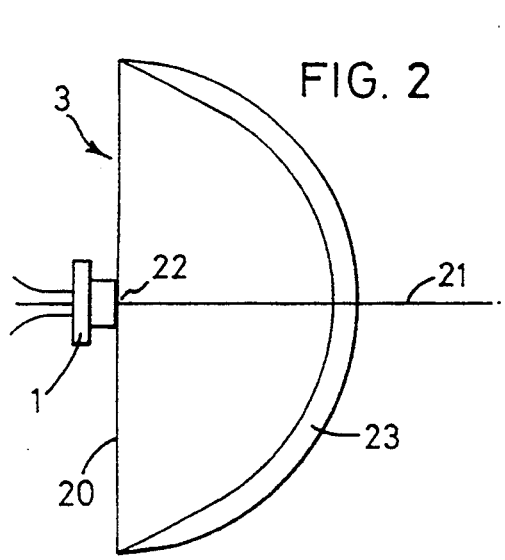
FIG. 2
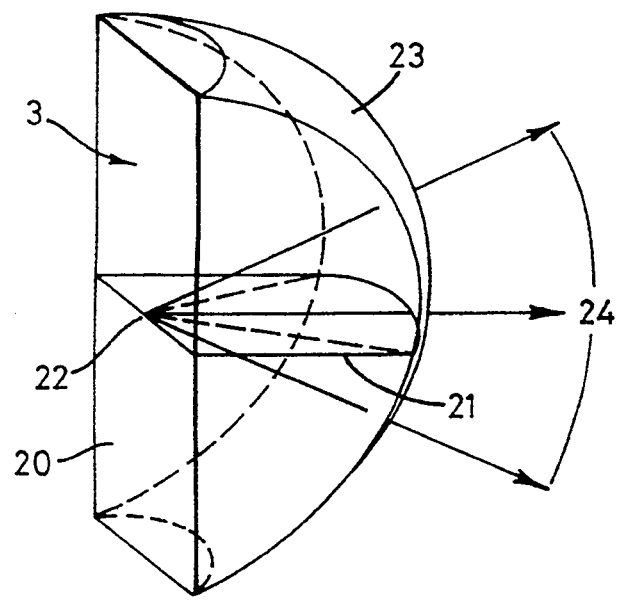
FIG. 3
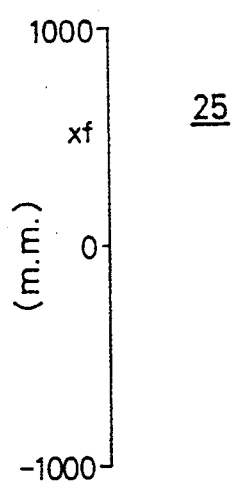
FIG. 7
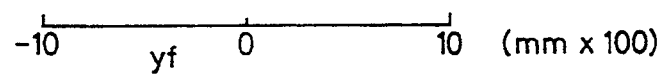

LASER LIGHT TRANSMITTER AND PROXIMITY DETECTOR

FIELD OF THE INVENTION

This invention relates to a laser light transmitter for producing a thin sheet of intense laser light and to a system for detecting, under ambient light conditions, the presence of an object intercepting a beam of laser light. (The term "laser light" is used herein to cover both visible and invisible coherent radiation.)

BACKGROUND OF THE INVENTION

Infrared proximity detectors are used to detect the presence of an object in the vicinity of machinery or automatic doors so as to inhibit operation of the machinery, or to open and close automatic doors. Infrared radiation is used because it provides an invisible beam in a sensing region adjacent the machinery or automatic doors. GB-A-2 207 999 discloses such a proximity detector in which an array of infrared light emitting diodes illuminate a reflector strip mounted in the object plan of a camera having a linear array of infrared sensors to detect the radiation returned by the reflecting strip. This arrangement provides a "curtain" of sensitivity over a wide area When an object passes through the "curtain" a dark shadow is obtained on the photosensitive array within the camera due to the appreciable difference in reflectivity between the reflector strip and the object. Therefore, the reflector strip is an important feature of this arrangement. Moreover, the circuitry used to process a proximity signal is adapted to respond to the shadow on the photosensitive array.

GB-A-2 166 831 also discloses an arrangement in which a curtain of radiation is spread across a detection zone and is returned, by a prismatic reflector, back to a photodiode array. However, in this case, a complicated optical arrangement is used to produce the curtain of radiation from an infrared source and to return the reflected radiation. The reflector is again an important feature of such an arrangement.

Besides the foregoing arrangements, which employ reflectors, proximity detectors have also been proposed which depend on using a receiver for radiation reflected directly from an object which intercepts beams of infrared radiation or acoustic energy. An example of such a system is disclosed in EP-A-226322. However, in such systems, the radiated energy is in the form of a cone with a maximum intensity on the conical axis and the reflected component is small. Therefore, complicated arrangements of e.g. a plurality of infrared transmitters and receivers need to be used to ensure that sufficient energy is radiated into the detection zone to detect objects of various sizes and/or having different reflectivities and to ensure that a detectable reflected component is returned from the object to the receiver to act as a trigger for proximity detection. These infrared transmitters and receivers are also mounted in spaced locations on a doorframe thereby entailing the use of complex wiring and expensive installation.

It would therefore be advantageous to provide a system which detects, in ambient light conditions, the presence of an object intercepting an infrared beam of radiation, which does not require the use of a reflecting strip, and which avoids the need for a plurality of transmitters/receivers as well as the need to install complex wiring. The present invention seeks to solve this problem by providing a laser light transmitter which can be used in an improved proximity detector system.

SUMMARY OF THE INVENTION

In accordance with the invention, there is provided a laser light transmitter comprising:
a lens having a body transparent to laser light, and
a laser light source at a focal point of the lens,
the body of the lens having an optically active surface which is symmetrically curved about said focal point to eliminate spherical aberration,
characterised in that said laser light source is a laser light emitting diode located as a point source at said focal point, that the curvature of said surface is elliptically symmetrical to eliminate spherical aberration, and that said surface is also circularly symmetrical about said focal point to eliminate coma, said elliptically symmetrical curvature being orthogonal to said circularly symmetrical curvature and the optically active surface of the lens being such as to produce a thin fan-shaped sheet of laser light from said laser source.

An advantage of this lens and diode arrangement is that it enables a safe power source of laser light (e.g. not exceeding 1 mW in its power output) to be used in generating a very powerful, but very thin planar sheet of laser light. This is useful in applications in the field of proximity detectors, but the lens diode arrangement may also be used elsewhere, for example, to provide a source of laser light for scanning a document (as in the case of facsimile machines), and as an alternative to devices which employ rotating optical components, such as mirrors.

Semi-conductor laser light emitting diodes produce coherent radiation but this is radiated somewhat "astigmatically" over a point source at the PN junction. In other words, the laser light is derived over a generally elliptic cone which may subtend approximately 20° on one axis and 40° on an orthogonal axis. If a conventional cylindrical lens were used with such a diode, although it could be used to produce a planar beam of radiation, the lens would introduce a great deal of spherical aberration and coma. This would produce a diffuse outline to the beam and increase its thickness towards its extremes. Consequently, the beam would not be very thin and very intense over a distance from the lens and diode arrangement.

In accordance with the invention, the optically active surfaces of a generally cylindrical lens are made circularly symmetrical about a point source of laser light to eliminate coma by making all ray paths through the lens identical. Moreover, by transferring all the optical power to one surface and by making that surface aspheric and partly toroidal in shape (e.g. with an eccentricity of about 0.5), spherical aberration is eliminated. The resulting lens is free of all significant aberration and can focus laser light into a well defined planar fan, for example, approximately 5 mm thick and extending over a divergence angle of about 40°. The laser light is therefore concentrated into an intense very thin fan-shaped beam. With a diode which generates an "astigmatic" cone of laser radiation, the diode is preferably rotated, about its axis, so that the plane in which a maximum divergence of radiation occurs is aligned with the first plane mentioned above to thereby provide a maximum divergence in a fan-shaped beam of laser light. However, this fan-shaped beam can be directed through e.g. a stop or aperture (which may be adjustable) to define a required sensing zone. It is also preferred for the lens to have a short focus, because the shorter the focus, the thinner will be the fan-shaped beam of laser light.

The body of the lens may include a plane face opposite the optically active curved surface, which plane face passes through the focal point where the diode is located. Parallel plane faces can extend at right angles to this flat surface, one at each side, and bounded by the curved optically active surface. Such a shape can be usually and inexpensively moulded from transparent plastics material, such as acrylic plastics. It is therefore possible to provide an inexpensive but well defined fan-shaped sheet of laser light by the combination of a lens and diode in accordance with the invention.

The invention also provides apparatus for detecting, under ambient light conditions, the presence of an object intercepting a beam of laser light, the apparatus comprising:

at least one of the above-mentioned laser light transmitters in which the diode emits infrared laser light, a linear array of infrared radiation sensors mounted adjacent a cylindrical lens which is intended to receive a component of said light directly from an object intercepting said light, said sensors thereby producing a proximity signal;

modulating means for causing said laser light to be modulated at a given frequency;

signal processing means responsive to the proximity signal for producing an output to signify the presence of an object intercepting laser light, said signal processing means including synchronous detecting means, driven by the modulating means, for synchronously detecting the proximity signal so as to reduce or eliminate noise, and comparator means to compare the detected signal with a reference to produce said output.

An advantage of this system is that no reflecting strips are required, as in the prior art, to reflect incident radiation back into a receiver. A further advantage is that the signal/noise ratio of the sensor signal is enhanced by synchronously detecting the modulated beam of radiation. The circuitry can also be housed in a casing which includes the lenses, laser diode, and the receiving sensors, which enables the casing to be simply installed, as a unit, in, e.g. the doorframe of a lift. A sensitive arrangement is thereby provided, with minimal installation costs, for detecting the presence of the object under ambient light conditions.

Either one, or (e.g.) two lenses (of the above-mentioned construction) can be provided with a respective laser light emitting diode at its respective foci. In a two lens combination, the longitudinal axis of each lens is aligned so that one lens can be mounted above the other, in a narrow aperture or slot, in a casing with slim dimensions to facilitate installation in e.g. a gap between a sliding lift door and a door opening. These lenses are also tilted, with respect to one another on the common longitudinal axis, so that the fan-shaped spread of one beam overlaps that of the other to maintain a generally constant level of optical power across the combined fan-shaped spread of the two beams. The amount of overlap is made at e.g. a 3 dB power fall off at the adjacent sides of the two beams to take account of the fall off of power at each side of a maximum at the centre of each beam.

In a preferred embodiment of the invention, an automatic door control assembly comprises:

a door frame, a door panel mounted for movement relative to the door frame; the door frame being located adjacent to a gap, or having a gap which extends in the direction of movement of a leading edge of the door panel;

a proximity detector having a laser light transmitter, a laser light receiver and circuitry responsive, to a proximity signal for controlling movement of the door panel; the laser light transmitter including a transmitting lens having a body transparent to laser light and a laser light source located with respect to the lens so as to produce a thin sheet of laser light, the laser light transmitter being positioned so as to direct the sheet of laser light into a detection zone in the door frame; the laser light receiver including a laser light sensor mounted adjacent a receiving lens for receiving laser light reflected from the detection zone and for generating a proximity signal, characterised in that the laser light source is a laser light emitting diode which is located, as a point source, at a focal point of the transmitting lens, the body of the transmitting lens having an optically active surface with a circularly symmetrical curvature about said focal point to eliminate coma, and an elliptically symmetrical curvature about said focal point so as to eliminate spherical aberration, said curvatures being orthogonal and said optically active surface being such as to produce a thin fan-shaped sheet of laser light, the laser light transmitter being mounted on a section of the door panel so that it transmits the fan-shaped sheet of laser light adjacent the leading edge of the door panel and into said gap the proximity signal being produced by light received directly from an object, intercepting the fan-shaped sheet of laser light, but not being produced when the fan-shaped sheet of laser light enters the gap only and is not intercepted by said object.

This assembly can be used in a lift door installation where, for example, the laser light transmitter and receiver are mounted, in a casing, which can be simply attached (as a unit) to an upper part of a sliding car door panel that moves relative to a car sill, i.e. towards or away from a respective slam post in the lift car. In such an installation, it is usual to provide a further sliding hoistway door panel, moving relative to a hoistway sill (towards or away from a respective slam post in the fixed door frame of the lift). A running clearance or gap between the lift and the hoistway door frame enables the lift to ascend or descend relative to the floors of a building. The leading edges of the car door panel and hoist panel move along the length of this gap when the doors operate. Preferably, the casing is mounted on the car door panel so that the thin fan-shaped sheet of laser light is transmitted adjacent the leading edge of the car door panel to provide a "moving" detection zone as the door panel closes (or opens). Hence, an obstruction will be sensed by the proximity detector, in this detection zone, so that closure of the car door panel can be arrested and the door panel returned to begin a further closing phase. This assembly has at least the following advantages:

(1) The thin fan-shaped beam can be easily adjusted, by using a predetermined stop or aperture (which may be adjustable) into a very accurately defined detection zone or proximity field. Other prior art arrangements have, by comparison, an ill-defined area of sensitivity.

(2) The proximity detector can have a very compact construction which eliminates large and heavy prior art detectors and it is also relatively immune to vandalism, compared with such known detectors.

(3) The proximity detector provides a detection zone having good sensitivity down to floor level (which is otherwise unobtainable with prior art detectors).

(4) The proximity detector is substantially unaffected by door vibration and wobble as the moving door closes (or opens).

It will be appreciated that the proximity detector of the invention can also be applied to a door which is made to open when an object is sensed in the detection zone, and/or that the door can be a swing door, instead of a sliding door.

DESCRIPTION OF THE DRAWINGS

Preferred embodiments of the invention will now be described with reference to the accompanying schematic Drawings, in which:

FIGS. 2 and 3 are side elevations and perspective views of a preferred form of lens for use with the laser diode transmitter, FIG. 7 illustrates a simulation of a distant surface illuminated by the laser light.

DESCRIPTION OF THE PREFERRED EMBODIMENTS

Figure 1:
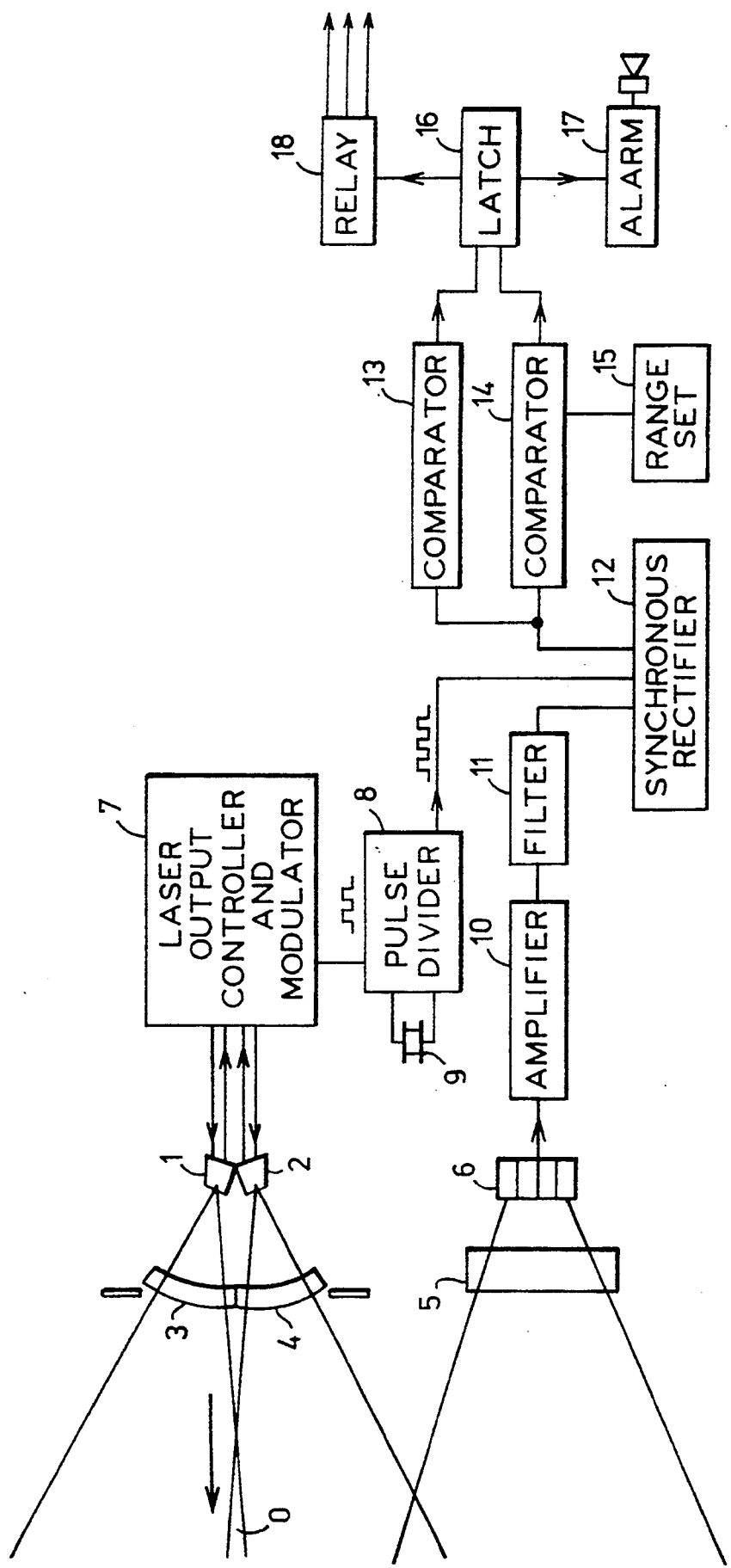
FIG. 1 illustrates a laser diode transmitter, a photodiode receiver and supporting circuitry.

Referring to the Drawings, a laser light transmitter comprises an infrared laser light emitting diode 1 located at the focal point of a specially shaped lens 3. A similar laser light transmitter includes an infrared laser light emitting diode 2 located at the focal point of a similar lens 4. Lenses 3 and 4 are arranged one above the other, with their longitudinal axes aligned. This arrangement produces two very thin planar sheets of laser infrared radiation which together form a fan-shaped beam extending over about 80° in the plane of the fan and diverging by less than 1° in the orthogonal plane. The minimal divergence (less than 1°) facilitates alignment of the beam with a narrow gap (e.g. 30–40 mm) between e.g. a sliding lift door and a door frame so that the intense thin beam of radiation normally enters the narrow gap (which can be considered to be optically non-reflective) hence avoiding or greatly reducing spurious proximity detection due to reflections from the door frame or door. By aligning the beam in this way, it forms a sheet through which a person or an object must pass thereby intercepting the beam to cause the light to be scattered by diffuse reflection. As shown in FIG. 1, the fan-shaped beams from each laser light emitter overlap one another in region O. This is to ensure that the optical power across the combined beams is generally constant, because each individual beam will have a central region of maximum power which falls off on either side of the maximum region. The overlap is at e.g. a 3 dB power fall off point for each individual beam which, in this example, is approximately equivalent to overlapping 20° at the side of one beam with 20° at the side of the other beam.

Although the laser light emitting diodes never exceed 1 mW power output (and are therefore a safe class one product), the nature of the lenses is such as to produce an extremely thin but particularly intense sheet of infrared laser radiation. This invisible radiation is not a health hazard and it is an excellent means of illuminating various objects, having different sizes and/or reflectivities, which pass through a proximity detection zone e.g. as through a doorframe at the entrance of a lift. A far better reflected component is therefore returned, even though the infrared light is scattered by diffuse reflection. Some of this reflected component is received by the focal field of a cylindrical lens 5 which has a column of photodiodes 6 at its linear focus. This column of diodes 6 is connected in parallel to produce an output signal which is supplied to the circuitry described below.

As the reflected component received by the cylindrical lens 5 and the photodiode column 6 is due to light scattered by diffuse reflection, and since proximity detectors are normally required to work under ambient light conditions, the photodiodes 6 will respond to undesirable radiation besides the required reflected component. They will hence generate noise as well as a useful signal and circuitry is required which will improve the signal/noise ratio and thereby improve the resolution of the system.

In accordance with the preferred embodiment of the invention, laser light emitting diodes 1 and 2 are connected to a laser output controller and modulator 7. This device is driven by a master square wave oscillator and pulse divider network 8, driven at a stable accurate frequency by crystal 9. The laser output light is therefore modulated at, for example, about 15 KHz with square wave pulses.

The photodiode column 6 is connected to a low noise amplifier 10 which has its output connected to a bandpass filter 11 that filters out signals which are closely centred on the modulation frequency of the laser light. A synchronous rectifier 12, which is driven by a similar square wave output from the master oscillator and divider 8, (i.e. at the same frequency), synchronously detects the filtered signal whereby only a reflected component signal having the same frequency as the transmitted light is allowed to pass to a comparator network for further signal processing. This synchronous detection greatly increases the signal/noise ratio and eliminates much of the noise in the system.

The comparator network includes a large signal comparator 13 and a self adjusting threshold comparator 14 which is connected to a range setting device 15. This circuitry enables the synchronously detected signal to be compared with a preset threshold, so as to provide a proximity output, and also enables this threshold to be automatically adjusted to compensate for, e.g. changes in ambient light conditions. In the case of installing the equipment in a lift doorway, the incident beam of radiation is preferably focused into the gap between the lift doors and the fixed doorway, so that the radiation is effectively received by a black body hence providing no spurious reflections. However, the comparator circuitry will also self adapt to a comparatively reflective surface, although there will be a drop in sensitivity, in order to allow objects to be detected against different backgrounds.

The outputs of comparators. 13 and 14 are supplied to a latch circuit 16 which provides, for example, a one second latch for operating a sound generating alarm 17 and a relay 18.

A further advantage of using the special lens arrangement (1, 3 and 2, 4) is that the system has a wider range of detection because the very thin sheet of laser light remains thin over a wide range and does not diverge appreciably. Hence, the quality of the reflected component is less affected by range than it would be in certain prior art arrangements.

The nature and construction of the special lens arrangement will now be described in more detail.

FIG. 2 is a side elevation showing how a laser light emitting diode 1 is located against a flat surface 20 of lens 3 coaxial with a radial axis 21 passing through a focal point 22 of the lens 3. An optically active surface 23 of lens 3 has two curvatures, one in each of respective orthogonal planes, as will be described in more detail below.

FIG. 3 shows the same lens (3), without the diode (1), but in a perspective view. The laser light diodes, which can be considered as a point source of light, is located as close as possible to focal point 22 in the flat surface 20. The arrangement is such that a thin fan-shaped beam 24 of laser light is produced by the lens 3 in a first plane which intercepts the curved surface 23 of the lens.

Figure 4:
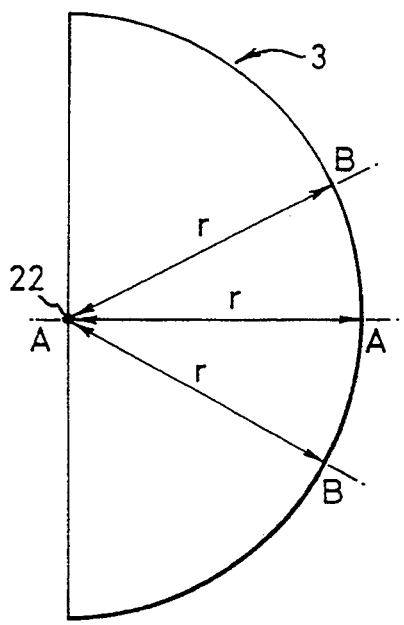
FIGS. 4, 5 and 6 are views of the lens for explaining its construction.

FIG. 4 is a vertical section to the focal point 22 of the lens 3 and it shows that the curved surface 23 is at equal radial distances "r" from the focal point 22. This is true for points on the curved surface 23 which can be considered to be rotated about the focal point 22 as a centre. This surface is circularly curved in vertical planes rotating about A.

Figure 5:
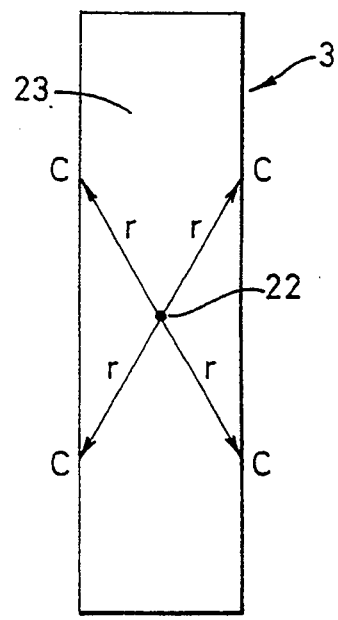

FIG. 5 is a front elevation of lens 23 showing other equidistant radial points c at the edges of the curved surface 23.

Figure 6:
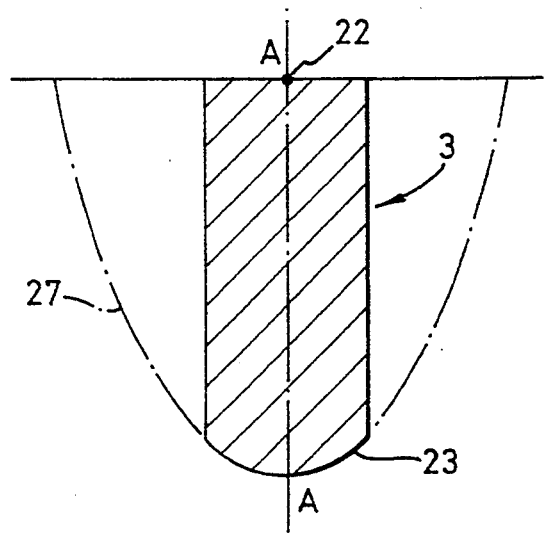

FIG. 6 is a section on AA (or AB, being identical) of the lens shown in FIG. 4. From FIG. 6, it cad be appreciated that the curvature of surface 23, in this section, conforms to the outline of an ellipse 24. The same section would be seen on AB of FIG. 4. This surface is elliptically curved in planes orthogonal to the vertical plane so that the elliptical surface rotates about point A.

When used with the laser light emitting diode (1), this lens is substantially free of spherical aberration and coma.

FIG. 7 shows a computer ray plot prediction simulating a distant surface 25 illuminated by the thin beam of laser light (which is seen as a thin line 26). The horizontal scale is magnified ($\times 100$), compared to the vertical scale, thereby indicating how thin the beam is on the surface 25. This computer prediction agrees closely with the effect achieved in practice. The beam (or line 26) is aligned with a door frame, e.g. the gap into which a sliding door is received in a lift with a door which is automatically opened and closed. The door is connected to circuitry which will cause it to open if a person or object intercepts the beam.

Figure 8:
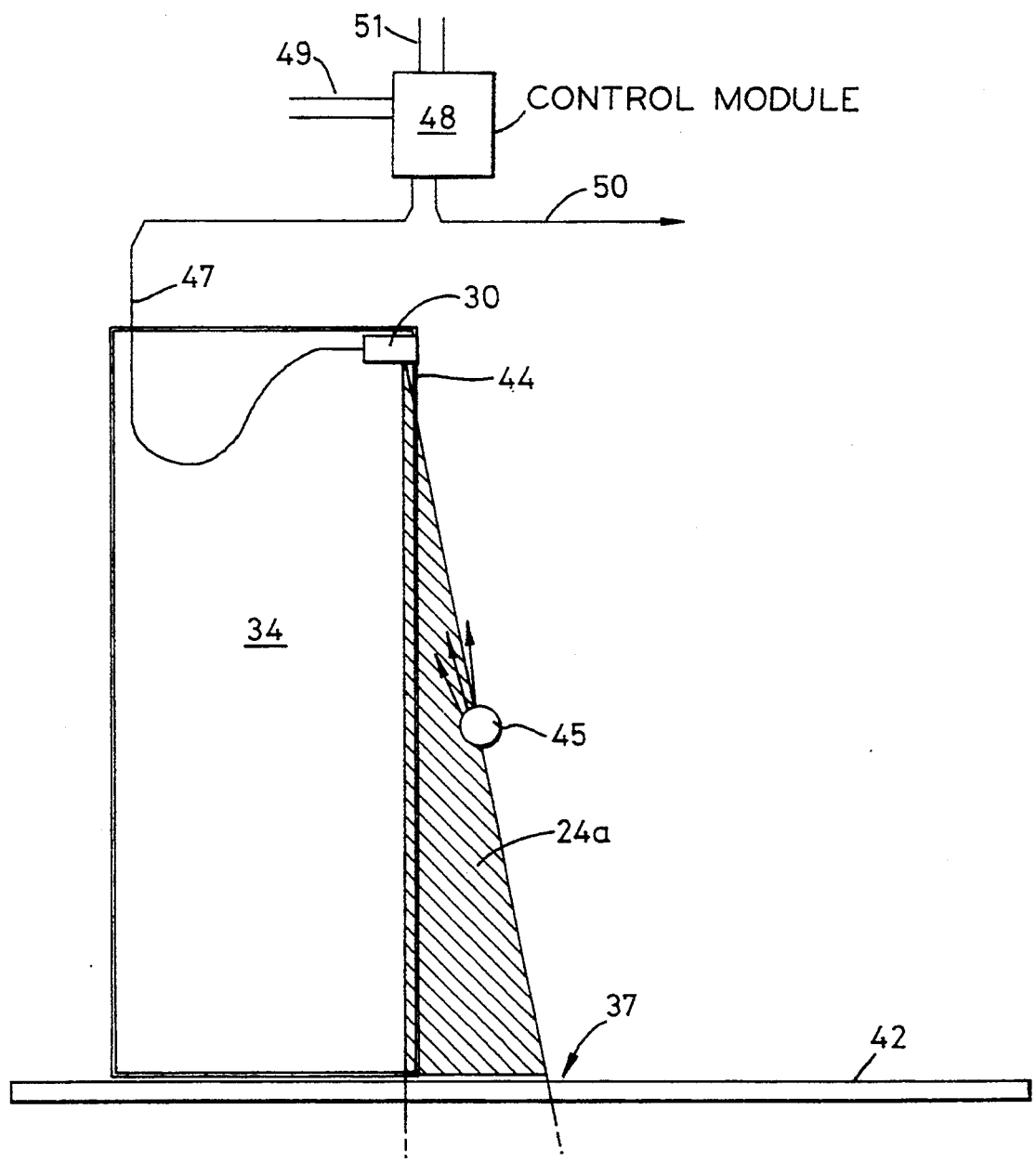
FIG. 8 is a front elevation of a door-mounted proximity detector.
Figure 9:
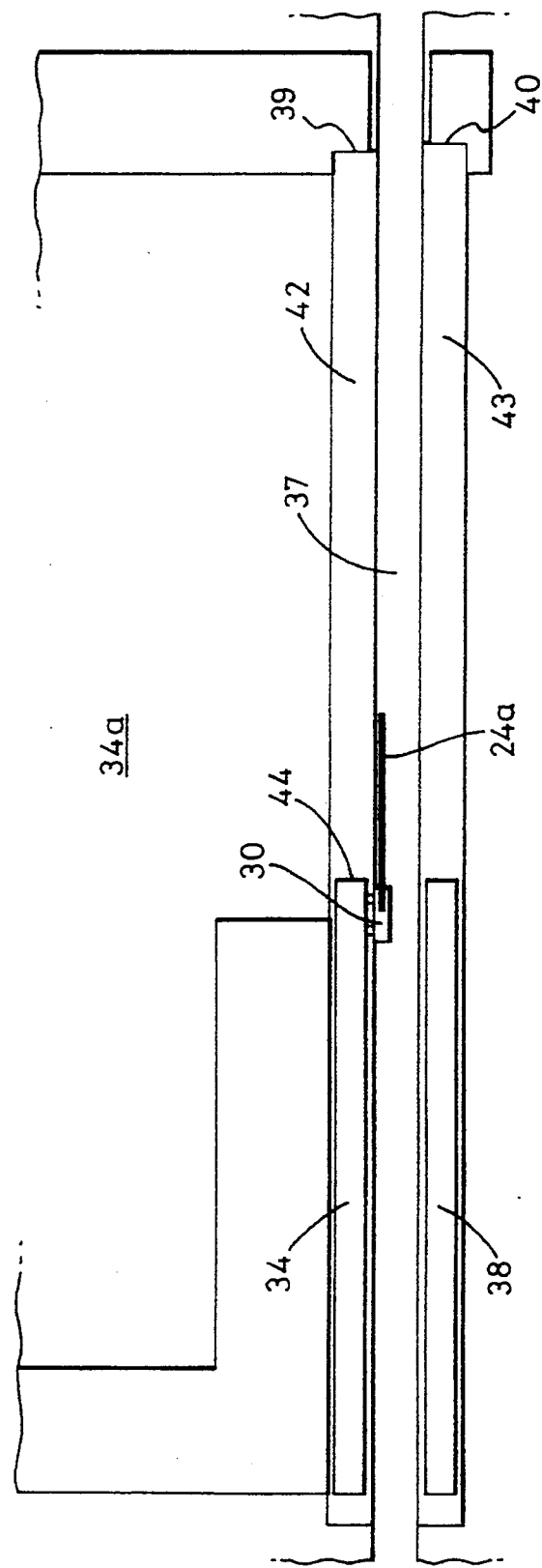
FIG. 9 is a plan view of the installation shown in FIG. 8.
Figure 10:
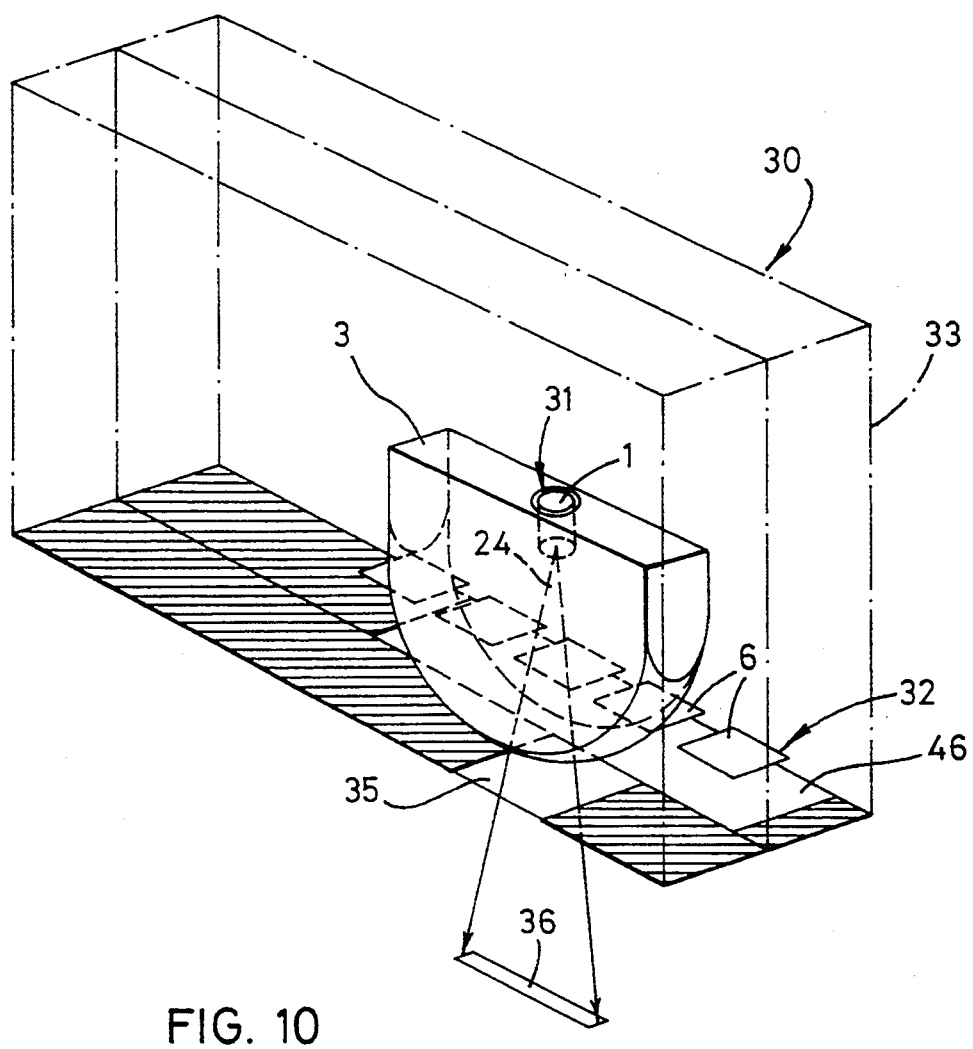
FIG. 10 is a perspective view of the proximity detector casing showing a stop to define a detection zone.

FIGS. 8, 9 and 10 show a proximity detector 30, which includes a laser light transmitter 31 and receiver 32 mounted in a casing 33 on the upper right-hand corner of a car door panel 34 of a lift car 34a. The transmitter 31 includes the lens 3 in which diode 1 is mounted (in this case, the lens body is extended to enable the diode 1 to be set into a cavity in the body). The transmitter 31 projects a thin fan-shaped beam 24 towards an aperture or stop 35 (which may be, e.g. a sliding shutter) which limits the proximity field to a very accurately defined detection zone 24a which would illuminate a projected line of irradiation 36 on a receiving surface. However, this beam 24 is normally aligned with the running clearance or gap 37 (as shown in FIG. 9) between the sliding car door panel 34 and hoistway door panel 38 of the lift installation. Since this gap 37 acts as a black body, no laser radiation is returned to the laser light receiver when no obstruction is present in the detection zone 24a. (No reflective strip is necessary as in prior art arrangements.) The door panels 34, 38 move towards respective slam posts 39, 40 respectively in the lift car and in the fixed hoistway door frame. Panels 34, 38 run on, or are supported for movement, relative to respective car and hoistway sills 42, 43.

FIG. 9 illustrates the triangular form of the stopped beam 24a, whereby one (vertical) edge of the beam 24a is parallel to the leading edge 44, of the car door panel 34 and another (slanted) edge of the beam 24a extends at an angle from the edge 44. The light lost into the running clearance or gap is unshaded, whilst the active detection zone is shaded in FIG. 8. An obstruction 45 scatters laser light receiver from the fan-shaped beam 24a and some of this light returns to the receiver 32, which includes a row of photodiodes 6 position above an aspheric cylindrical lens 5 (not shown for clarity). Lens 5 is positioned above an aperture 46 having a greater extent than stop 35. Photodiodes 6 are connected to circuitry, such as that shown in FIG. 1, to provide a proximity signal for controlling the car door panel 34.

The interior of casing 33 is preferably lined or coated with a matt black substance to absorb any spurious reflections.

FIG. 8 also shows a travelling cable 47 connected to a control module 48 which houses the circuitry for providing a relay output (on lines 49) to a door motor (not shown) and a similar relay output on line 50 to another door, if panel 34 is one of a centre-opening pair. Module 48 is also connected to power leads 51.

We claim:

1. A laser light transmitter comprising:
   a lens transparent to laser light; and
   a laser light emitting diode at a focal point of the lens;
   the lens having a surface which is elliptically and symmetrically curved about said focal point to eliminate spherical aberration, said surface also being circularly symmetrical about said focal point to eliminate coma, said elliptically symmetrical curvature being orthogonal to said circularly symmetrical curvature, said surface of the lens producing a fan-shaped sheet of laser light from said laser light emitting diode.

2. A laser light transmitter according to claim 1 wherein said lens has a flat rear surface opposite said curved surface, said rear surface extending in a plane which contains said focal point, and flat side surfaces extending orthogonally from the rear surface, said flat side surfaces being bounded by the curved surface.

3. Apparatus for detecting, in ambient light, the presence of an object intercepting a beam of laser light, the apparatus comprising:
   at least one laser light transmitter according to claim 1, the respective diodes of said at least one transmitter emitting infrared laser light, whereby the respective lenses of said at least one transmitter produce respective fan-shaped sheets of infrared laser light;
   modulating means for causing said infrared laser light emitted by said diodes to be modulated at a given frequency;
   a linear array of infrared radiation sensors mounted adjacent a cylindrical lens which is intended to receive a component of said sheets of infrared laser light reflected directly from said object, said reflected light causing one or more of said sensors to produce one or more proximity signals;

signal processing means for receiving said proximity signals from said sensors, said signal processing means including synchronous detecting means, driven by the modulating means, for detecting the proximity signals so as to reduce or eliminate noise, and comparator means for comparing the synchronously detected signals with a reference to produce an output which signifies the presence of said object.

4. Apparatus according to claim 3 in which the at least one transmitter, the linear array of infrared radiation sensors, and the signal processing means are all mounted in a unitary housing for installation adjacent a region in which the presence of the object is to be detected.

5. Apparatus according to claim 4 further including a lift installation comprising a lift car having a door frame and sliding door, said sliding door being retractably mounted in said door frame, said lift installation having a lift car hoistway and a hoistway door, said lift car sliding door being spaced from said hoistway door to provide a clearance gap therebetween, said housing being mounted on said lift car door frame so that said respective fan-shaped sheets of laser light are directed into said gap, whereby none of the laser light directed into said gap is returned, by reflection, to said linear array of sensors.

6. Apparatus according to claim 3 comprising two of said infrared laser light transmitters respectively having first and second lenses, the first lens being mounted adjacent the second lens so that the first and second lenses produce respective fan-shaped sheets of infrared laser light which are co-planar.

7. Apparatus according to claim 6 in which said sensors are photodiodes which are mounted at the focus of the cylindrical lens.

8. Apparatus according to claim 7 in which the modulating means synchronously drives said light emitting diodes and the synchronous detecting means with a square wave pulse of the same frequency.

9. In a lift installation comprising a lift car having a door frame and a sliding door, said sliding door being retractably mounted in said door frame;

a lift car hoistway having a hoistway door, said lift car sliding door being spaced from said hoistway door to provide a clearance gap therebetween;

a proximity detector having a laser light transmitter for irradiating an object with laser light, a laser light receiver for receiving laser light reflected from the object and for generating proximity signals, and circuitry responsive to said proximity signals for controlling movement of the lift car door; the laser light transmitter including a transmitting lens transparent to laser light and a laser light source located with respect to the lens so as to produce a sheet of laser light, the laser light transmitter being positioned so as to direct the sheet of laser light into a detection zone in the area defined by the lift car door frame; the laser light receiver including a laser light sensor mounted adjacent a receiving lens for receiving laser light reflected from the detection zone and for generating said proximity signals;

the improvement wherein the laser light source is a laser light emitting diode which is located at a focal point of the transmitting lens, the transmitting lens having a surface with a circularly symmetrical curvature about said focal point to eliminate coma, and an elliptically symmetrical curvature about said focal point so as to eliminate spherical aberration, said curvatures being orthogonal, and said surface producing a fan-shaped sheet of laser light from said laser source, the laser light transmitter being mounted on a panel of the lift car door so that it transmits the fan-shaped sheet of laser light adjacent a leading edge of the door panel and into said gap, the proximity signal being produced when light is reflected directly from an object intercepting the fan-shaped sheet of laser light, but not being produced when the fan-shaped sheet of laser light enters the gap without being reflected by said object.

10. The invention according to claim 9 wherein the laser diode is mounted on the lens of the laser transmitter, the laser transmitter and receiver being mounted in a casing provided with a predetermined aperture to define the spread of the fan-shaped sheet of laser light in the detection zone.

11. The invention according to claim 10 and further including:

modulating means for causing said laser light to be modulated at a given frequency;

signal processing means responsive to the proximity signals for producing an output to signify the presence of an object intercepting the laser light, said signal processing means including synchronous detecting means, driven by the modulating means, for detecting the proximity signals so as to reduce or eliminate noise;

and comparator means to compare the detected proximity signals with a reference to produce said output.

* * * * *